(12) United States Patent
Kim

(10) Patent No.: US 8,592,070 B2
(45) Date of Patent: Nov. 26, 2013

(54) LITHIUM RECHARGEABLE BATTERY

(75) Inventor: Jinhee Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1603 days.

(21) Appl. No.: 11/508,604

(22) Filed: Aug. 22, 2006

(65) Prior Publication Data

US 2007/0048602 A1  Mar. 1, 2007

(30) Foreign Application Priority Data

Aug. 25, 2005  (KR) .......................... 10-2005-0078159

(51) Int. Cl.
*H01M 4/02* (2006.01)
*H01M 4/64* (2006.01)

(52) U.S. Cl.
USPC ........... 429/127; 429/137; 429/246; 429/251; 429/252

(58) Field of Classification Search
None
See application file for complete search history.

(56) References Cited

U.S. PATENT DOCUMENTS

| | | | |
|---|---|---|---|
| 6,291,102 B1 * | 9/2001 | Yoshida et al. | 429/231.95 |
| 6,387,564 B1 * | 5/2002 | Yamashita et al. | 429/132 |
| 2001/0000485 A1 * | 4/2001 | Ying et al. | 429/228 |
| 2002/0048704 A1 * | 4/2002 | Murai et al. | 429/144 |
| 2002/0055038 A1 | 5/2002 | Aihara et al. | |
| 2003/0049527 A1 * | 3/2003 | Yageta et al. | 429/179 |
| 2005/0069769 A1 | 3/2005 | Nakayama et al. | |
| 2007/0009803 A1 * | 1/2007 | Kim et al. | 429/251 |

FOREIGN PATENT DOCUMENTS

| | | |
|---|---|---|
| EP | 0 959 513 A1 | 11/1999 |
| EP | 0 967 678 A1 | 12/1999 |
| EP | 1 381 097 A1 | 1/2004 |
| EP | 1 715 542 A1 | 10/2006 |
| KR | 2002-0071204 | 9/2002 |

OTHER PUBLICATIONS

Korean Patent Abstracts, Publication No. 1020020071204 A; Publication Date: Sep. 12, 2002; in the name of Ahn, et al.

* cited by examiner

*Primary Examiner* — Ula C. Ruddock
*Assistant Examiner* — Alix Echelmeyer
(74) *Attorney, Agent, or Firm* — Christie, Parker & Hale, LLP

(57) ABSTRACT

A lithium rechargeable battery including a cathode, an anode, a separator for separating the cathode from the anode, and a non-aqueous electrolyte is provided. Each of the cathode and the anode includes an electrode collector and an electrode active material layer formed on the electrode collector. The separator comprises a porous membrane including a ceramic material and a binder. The peel strength of the electrode active material layer to the electrode collector is greater than the peel strength of the porous membrane to the electrode collector. Particularly, the peel strength of the active material layer to the electrode collector is 2 gf/mm or higher when measured before battery assembly, and the peel strength of the porous membrane to the electrode collector is 0.2 gf/mm or higher when measured before battery assembly.

20 Claims, 1 Drawing Sheet

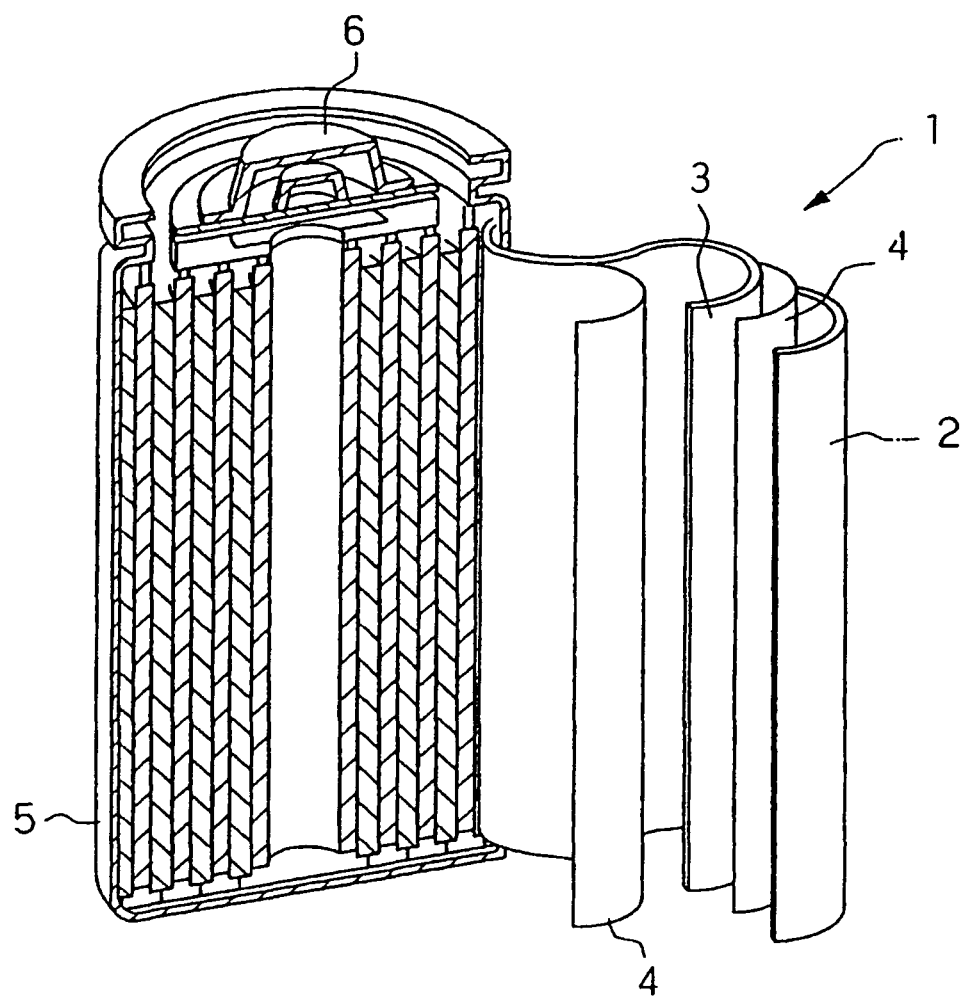

LITHIUM RECHARGEABLE BATTERY

CROSS-REFERENCE TO RELATED APPLICATIONS

This application claims priority to and the benefit of Korean Application No. 2005-0078159, filed Aug. 25, 2005 in the Korean Intellectual Property Office, the entire content of which is incorporated herein by reference.

BACKGROUND OF THE INVENTION

1. Field of the Invention

The present invention relates to lithium rechargeable batteries. More particularly, the present invention relates to lithium rechargeable batteries having excellent safety, improved short circuit resistance and improved heat resistance.

2. Description of Related Art

Recently, portable electronic instruments have been designed to have low weight and compact size. As such, batteries used as driving sources for such instruments have been required to have low weight and high capacity. Active and intensive research and development have been conducted into lithium rechargeable batteries. Lithium rechargeable batteries typically have drive voltages of 3.6 V or higher, which is at least three times higher than the drive voltages of Ni—Cd batteries or Ni-MH batteries which are currently widely used as power sources for portable electronic instruments. Moreover, lithium rechargeable batteries provide higher energy densities per unit weight than do Ni—CD or Ni-MH batteries.

A lithium rechargeable battery generates electric energy through redox reactions occurring during lithium ion intercalabon/deintercalation in the cathode and anode. A lithium rechargeable battery is manufactured by placing an organic electrolyte or a polymer electrolyte between a cathode and an anode, each of which includes a material capable of reversible lithium ion intercalation/deintercalation as active material.

A typical lithium rechargeable battery includes an electrode assembly formed by winding an anode plate, a cathode plate and a separator positioned between the electrode plates into a predetermined shape such as a jelly-roll shape. The battery further includes a can for housing the electrode assembly, an electrolyte, and a cap assembly mounted to the top of the can. The cathode plate of the electrode assembly is electrically connected to the cap assembly via a cathode lead, and the anode plate of the electrode assembly is electrically connected to the can via an anode lead.

The separator in a lithium rechargeable battery functions basically to separate the cathode and the anode from each other to prevent short circuits. Add itonally, the separator maintains high ion conductivity and allows infiltration of the electrolyte necessary to carry out electrochemical reactions in the battery. Particularly, in lithium rechargeable batteries, separators must also prevent movement within the battery of substances capable of inhibiting such electrochemical reactions. The separator may also function to ensure the safety of the battery under abnormal conditions.

Generally, the separator includes a polyolefin based microporous polymer membrane (such as polypropylene or polyethylene), or a multilayer membrane including multiple sheets of such membranes. Such conventional separators consist of sheet-like or film-like porous membrane layers, and are disadvantageous in that if heat emission occurs due to an internal short circuit or overcharge, the pores of the porous membrane may become blocked and the sheet-like separator may shrink. If the sheet-like separator shrinks due to such internal heat emission of the battery, the area covered by the separator may decrease and the cathode and anode may directly contact each other, resulting in ignition and explosion of the battery.

To ensure the safety of batteries upon heat emission caused by short circuits, these film-like separators often have so-called shutdown actions that interrupt lithium ion movement (i.e. current flow) by blocking the pores of the separator with a softened polypropylene or polyethylene resin. However, these separators are still disadvantageous when an internal short circuit occurs. For example, using a nail test (perforation) to simulate an internal short circuit condition, it can be shown that the heat emission temperature may locally reach several hundred degrees C depending on the test conditions. Consequently, the porous membrane layer is deformed by the softening or loss of the resin. Further, in the nail test, the test nail perforates the cathode and the anode, thereby causing an abnormal overheating phenomenon. Therefore, a separator membrane using the aforementioned shutdown action with a softened resin cannot provide an absolute safety measure against internal short circuits.

Additionally, lithium dendrites may be formed on a film-like separator upon overcharge of the lithium rechargeable battery. This occurs because there is typically a gap between the anode and the film-like separator. Lithium ions that cannot infiltrate the anode accumulate in the gap between the anode and the film, resulting in the precipitation of lithium metal. If lithium precipitation occurs over the entire surface of the film, such lithium dendrites may penetrate through the film-like separator so that the cathode comes into direct contact with the anode. At the same time, side reactions may occur between lithium metal and the electrolyte to cause heat emission and gas generation, resulting in the ignition and explosion of the battery.

Moreover, a film-like separator cannot function as a separator separating the cathode and anode when it is not in an aligned state. The separator may fall out of an aligned state due to vibration or dropping. When this occurs, the cathode and anode come into direct contact with each other, thereby generating a short circuit and resulting in battery malfunction. In addition, a film-like separator may be wound incorrectly during battery manufacture, resulting in an increase in the production of defective products and a decrease in safety. Further, a film-like separator cannot be used at high temperatures of 100° C. or greater because the film melts at such high temperatures.

SUMMARY OF THE INVENTION

In one embodiment of the present invention, a lithium rechargeable battery has improved heat resistance, electrolyte resistance and safety.

According to one embodiment of the present invention, a lithium rechargeable battery includes an electrode assembly including a cathode, an anode and a separator separating the cathode and anode from each other. The battery further includes a non-aqueous electrolyte. Each of the cathode and anode includes an electrode collector and an electrode active material layer formed on the electrode collector. The separator includes a porous membrane formed of a ceramic material and a binder. The peel strength of the electrode active material layer to the electrode collector is greater than the peel strength of the porous membrane to the electrode collector.

According to one embodiment of the present invention, the peel strength of the active material layer to the electrode collector is about 2 gf/mm or higher, and the peel strength of the porous membrane to the electrode collector is about 0.2 gf/mm or higher, when measured before battery assembly.

According to another embodiment of the present invention, the peel strength of the active material layer to the electrode collector is about 5 gf/mm or higher when measured prior to battery assembly. In still another embodiment, the peel strength of the active material layer to the electrode collector ranges from about 5 to about 10 gf/mm when measured before battery assembly.

According to one embodiment of the present invention, the difference between the peel strength of the active material layer to the electrode collector and the peel strength of the porous membrane to the electrode collector ranges from about 1.8 gf/mm to about 14.8 gf/mm, and the peel strength of the porous membrane to the electrode collector is about 0.2 gf/mm or higher when measured before battery assembly.

According to another embodiment of the present invention, the peel strength of the active material layer to the electrode collector is about 0.1 gf/mm or higher, and the peel strength of the porous membrane to the electrode collector is about 0.4 gf/mm or higher as measured when the battery is in a discharged state after the battery has been assembled and subjected to at least one charge/discharge cycle.

According to another embodiment of the present invention, the difference between the peel strength of the active material layer to the electrode collector and the peel strength of the porous membrane to the electrode collector ranges from about 0.3 gf/mm to about 7.1 gf/mm as measured when the battery is in a discharged state after the battery has been assembled and subjected to at least one charge/discharge cycle.

According to one embodiment of the present invention, the active material layer may be formed by preparing an electrode active material slurry having a viscosity ranging from about 3000 to about 4000 cps. Similarly, the porous membrane may be formed by preparing a paste having a viscosity ranging from about 20 to about 1000 cps.

According to one embodiment of the present invention, the porous membrane may include secondary particles of a ceramic material bonded to each other by a binder. The secondary particles are formed by partial sintering or recrystallization of primary particles of the ceramic material.

BRIEF DESCRIPTION OF THE DRAWINGS

These and other features and advantages of the present invention will be better understood with reference to the following detailed description when considered in conjunction with the accompanying drawings in which:

FIG. 1 is a schematic perspective view of a lithium battery according to one embodiment of the present invention.

DETAILED DESCRIPTION OF THE EMBODIMENTS

The separator according to one embodiment of the present invention includes a porous membrane formed of a ceramic material and a binder. The porous membrane is formed by first preparing a paste by mixing the ceramic material and the binder in a solvent. The paste is then coated on the cathode or the anode to form the porous membrane. The porous membrane serves as a film-like separator, similar to conventional polyethylene (PE) or polypropylene (PP) separators.

To achieve improved battery safety, the peel strength of the electrode active material to the electrode collector is greater than the peel strength of the porous membrane to the electrode collector. This is because the electrode active material may separate from the electrode substrate during winding of the electrode coated with the porous membrane due to the higher stress of the porous membrane.

Particularly, the peel strength of the porous membrane to the electrode collector is about 0.2 gf/mm or higher. If the porous membrane is coated on the electrode active material layer, a low peel strength of the porous membrane to the cathode or the anode may cause separation of the porous membrane.

The peel strength of the electrode active material layer to the electrode collector may be about 2 gf/mm or higher. In one embodiment, the peel strength of the electrode active material layer to the electrode collector may be about 5 gf/mm or higher. In another embodiment, the peel strength of the electrode active material layer to the electrode collector ranges from about 5 to about 10 gf/mm or higher. When the electrode active material layer supporting the porous membrane has a low peel strength to the electrode collector, the electrode active material layer may separate from the electrode collector supporting the porous membrane due to the stress generated as the porous membrane dries on the electrode active material layer.

Additionally, the difference between the peel strength of the electrode active material layer to the electrode collector and the peel strength of the porous membrane to the electrode collector ranges from about 1.8 gf/mm to about 14.8 gf/mm. As mentioned above, the peel strength of the porous membrane to the electrode collector should be about 0.2 gf/mm or higher. A higher peel strength of the active material layer to the electrode collector is better. However, increasing the amount of binder to increase adhesion of the active material layer to the electrode collector results in a reduction in the amount of active material that can be added to the electrode. Hence, the amount of binder is limited, and thus the peel strength of the electrode active material layer to the electrode collector is limited.

When the porous membrane is formed on the electrode active material layer, the peel strength of the porous membrane to the electrode active material layer cannot be measured directly. This is because the degree of adhesion between the electrode active material layer (which has a rough surface and a larger surface area) and the porous membrane is greater than the degree of adhesion between the electrode active material layer and the electrode collector. Thus, the electrode active material layer may separate from the electrode collector before the peel strength of the porous membrane to the electrode active material layer can be measured during a peel test. Additionally, since the electrode active material layer has a rough surface, it is difficult to cleanly remove the porous membrane in a single layer. Hence, the degree of adhesion of the porous membrane is measured indirectly after the electrode collector has been coated with the porous membrane paste containing the ceramic material, the binder and the solvent, and after the coated porous membrane layer has dried.

According to one embodiment of the present invention, the peel strength of the active material layer to the electrode collector is about 0.1 gf/mm or greater, and the peel strength of the porous membrane layer to the electrode collector is about 0.4 gf/mm or greater as measured when the battery is in a discharged state after the battery has been assembled and subjected to at least one charge/discharge cycle. Since the measured peel strength of the electrode plate before battery assembly is different from the measured peel strength when the battery is in a discharged state after battery assembly (i.e. after the wound electrode assembly is introduced into a can, an electrolyte is injected in the can and the resultant battery is subjected to at least one charge/discharge cycle), the peel strengths are variable depending on the measurement conditions. The peel strength measured after battery assembly is less than the peel strength of the electrode plate before battery assembly. The peel strength measured after the battery is assembled and subjected to at least one charge/discharge cycle is less than the peel strength measured before battery assembly by about 2 to about 10 gf/mm.

The battery is disassembled in a discharged state because the battery in a charged state has lithium ions intercalated into the anode active material, causing the anode active material to swell, resulting in a lower peel strength. In addition, the lithium metal present on the anode surface may react rapidly with moisture or may be ignited even with a small spark For these reasons, the battery is stably disassembled in a discharged state.

According to one embodiment of the present invention, the difference between the peel strength of the active material layer to the electrode collector and the peel strength of the porous membrane layer to the electrode collector ranges from about 0.3 gf/mm to about 7.1 gf/mm as measured when the battery is in a discharged state after the battery has been assembled and subjected to at least one charge/discharge cycle.

The peel strength after battery assembly is measured by first assembling the battery and subjecting it to at least one charge/discharge cycle. The battery is then disassembled while in a discharged state in a dry room so as to prevent lithium metal from reacting rapidly with moisture. As the number of charge/discharge cycles increases, the anode repeatedly swells and shrinks, and thus the peel strength continuously decreases.

The peel strength of the porous membrane layer to the electrode collector can be measured after the battery is disassembled because the porous membrane layer is coated on the non-coated portion of the electrode collector (i.e. the portion of the electrode collector having no active material layer) as well as being coated on the active material layer. If the non-coated portions of the electrode collector are insufficiently coated with the porous membrane layer to enable measurement of the peel strength, the non-coated portions of the electrode collector may be coated again with the porous membrane layer, and the peel strength measured before and after dipping the collector into an electrolyte. This procedure yields the same data regarding peel strength.

To measure the peel strength after assembling the battery, the lithium salt, electrolyte additives and the solvent remaining on the disassembled electrode plate should be removed. Before measuring the peel strength, a double-sided tape is attached on the surface of the electrode plate. However, if the electrode plate is contaminated with lithium salt, adhesion of the tape may be insufficient. Therefore, electrolyte residue present on the electrode surface is washed with dimethyl carbonate (DMC), which is used as an electrolyte solvent and has good volatility. The electrode plate is then dried in a dry room for at least 30 minutes before measurement.

The peel strength of the porous membrane and that of the electrode active material layer can be controlled by adjusting the type and amount of the binder, the viscosity of the slurry or paste, and the degree of rolling during the manufacture of the electrode. Since different binders have different adhesion levels, the peel strength can be controlled by varying the binder. Additionally, even if the same binder is used, a desired level of peel strength can be obtained by controlling the amount of the binder because to a certain degree the adhesion of the binder increases in proportion to the amount of the binder.

According to one embodiment of the present invention, acrylic rubber is used as the binder for the porous membrane, and a weight ratio of the ceramic material to the binder ranges from about 98:2 to about 80:20 in order to control the peel strength of the porous membrane. In another embodiment, the weight ratio of the ceramic material to the binder ranges from about 95:5 to about 90:10.

Additionally, the peel strength can be controlled by varying the viscosity of the paste for forming the porous membrane or the viscosity of the electrode active material slurry. The viscosity of the slurry or the paste can be increased or reduced (i.e. the slurry or paste can be concentrated or diluted) by varying the amount of dispersion solvent used for the slurry or the paste. According to one embodiment of the present invention, in order to obtain a desired peel strength, the electrode active material slurry has a viscosity ranging from about 3000 to about 4000 cps, and the paste for forming the porous membrane has a viscosity ranging from about 20 to about 1000 cps.

The electrode active material layer is formed by applying the electrode active material slurry to the electrode collector, followed by drying and rolling the resulting electrode. The rolling process is performed during the manufacture of the electrode plate by subjecting the battery to a roll press after the battery has been dried at a desired temperature (for example, at a temperature ranging from about 80 to about 140° C.) in order to compress the electrode plate to a desired thickness. The rolling serves to increase the density capacity of the active material coated on the electrode plate, and to improve the adhesion between the electrode substrate and the active material. The peel strength of the electrode active material layer increases in proportion to the degree of rolling. In other words, an electrode having a lesser thickness (e.g. by applying added pressure during rolling) shows increased peel strength. Additionally, the peel strength can be increased by increasing the density of the mixed electrode slurry (i.e. by increasing the weight of the electrode active material and binder per unit volume). However, excessive compression of the coated electrode plate may cause cracking of the electrode active material layer. According to one embodiment of the present invention, the mixed electrode active material slurry has a density ranging from about 1.7 to about 1.9 g/cc to control the peel strength of the electrode active material layer. After forming the porous membrane layer on the electrode active material layer, a further rolling process may be conducted to increase the adhesion between the porous membrane and the electrode.

According to one embodiment of the present invention, acrylic rubber having a crosslinked structure may be used as the binder. The acrylic rubber having a crosslinked structure may be formed by crosslinking a polymer or copolymer of a primary acrylic monomer with a crosslinkable comonomer. If a polymer or copolymer of a primary acrylic monomer is used without crosslinking, the polymer or copolymer may be easily cleaved due to its weak bonding structure. However, if a crosslinkable monomer is added to the polymer or copolymer of the primary acrylic monomer, the crosslinkable monomer bonds with the polymer or copolymer of the primary acrylic monomer, thereby forming a stronger network structure. Such polymers having stronger network structures do not easily swell in solvent, which advantage increases as the crosslinking degree increases. The acrylic rubber binder having a crosslinked structure may include a three dimensional crosslinking structure having from 2 to 10 crosslinking points per unit with a weight average molecular weight of 10,000 in the backbone molecule. In one embodiment, the binder has from 4 to 5 crosslinking points per unit with a weight average molecular weight of 10,000 in the backbone molecule. Therefore, the acrylic rubber binder having a crosslinked structure according to one embodiment of the present invention exhibits a swelling resistance sufficient to prevent swelling from occurring when the porous membrane is impregnated with the electrolyte.

The ceramic material used in the separator (described more fully below) typically has a decomposition temperature of about 1000° C. or higher, and the binder used in the porous membrane includes an acrylic rubber binder having a decomposition temperature of about 250° C. or higher. Hence, it is possible to obtain a battery having high heat resistance and a good stability against internal short circuits.

Nonlimiting examples of suitable primary acrylic monomers for use in the binder include alkoxyalkyl acrylates, alkenyl acrylates and alkenyl methacrylates, unsaturated dicarboxylic acid esters, vinyl group containing ethers, 1-acryloyloxy-1-phenylethene, methyl methacrylate and combinations thereof. Nonlimiting examples of suitable alkoxyalkyl acrylates include methoxymethyl acrylate, methoxyethyl acrylate, ethoxyethyl acrylate, butoxyethyl acrylate, methoxyethoxyethyl acrylate and dicyclopentenyloxyethyl acrylate. Nonlimiting examples of suitable alkenyl acrylates and alkenyl methacrylates include vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate. Nonlimiting examples of suitable unsaturated dicarboxylic acid esters include divinyl itaconate and divinyl maleate. Nonlimiting examples of suitable vinyl group-containing ethers include vinyl 1,1-dimethylpropenyl ether and vinyl 3,3-dimethylbutenyl ether.

Nonlimiting examples of suitable crosslinkable comonomers for use in the binder include alkyl acrylates, alkenyl chloroacetates, glycidyl group containing esters and ethers, unsaturated carboxylic acids, 2-chloroethyl vinyl ether; chloromethyl styrene, acrylonitrile and combinations thereof. Nonlimiting examples of suitable alkyl acrylates include 2-ethylhexyl acrylate, methyl acrylate, ethyl acrylate, propyl acrylate, butyl acrylate, octyl acrylate and isooctyl acrylate. Nonlimiting examples of suitable alkenyl chloroacetates include vinyl chloroacetate and acryl chloroacetate. Nonlimiting examples of suitable glycidyl group-containing esters and ethers include glycidyl acrylate, vinyl glycidyl ether and acryl glycidyl ether. Nonlimiting examples of suitable unsaturated carboxylic acids include acrylic acid, methacrylic acid and maleic acid.

The weight ratio of the polymer or copolymer of the primary acrylic monomer to the crosslinkable comonomer ranges from about 90:10 to about 60:40. In one non-limiting example, the weight ratio of the polymer or copolymer of the primary acrylic monomer and the crosslinkable comonomer is 70:30. As the relative amount of the polymer or copolymer of the primary acrylic monomer increases, the binder in the porous membrane formed on the cathode or anode softens due to elastomeric elasticity and softness. Therefore, the binder exhibits an improved winding capability. However, if the weight ratio of the polymer or copolymer of the primary acrylic monomer to the crosslinkable comonomer is greater than the 90:10 ratio describe above, the resultant battery exhibits decreased quality due to increased swelling tendencies in the presence of an electrolyte. As the content of the crosslinkable comonomer (which is added to improve crosslinkability) increases, the binder hardens and decreases in softness, thereby exhibiting poor winding capability.

The polymer or copolymer of the primary acrylic monomer may have a weight average molecular weight ranging from about 10,000 to about 5,000,000.

If the side branches of the polymer or copolymer of the primary acrylic monomer are partially capped with alkali metals such as Na or K and the resultant product is blended with the crosslinkable comonomer, the alkali metals are isolated from the polymer or copolymer before crosslinking, thereby forming an acrylic rubber binder having a crosslinked structure. For example, when polymethyl methacrylate (PMMA) (which may used as the polymer or copolymer of main acrylic monomer) is capped with alkali metals, some of the ester side branches are present as carboxylated side branches.

In one embodiment of the present invention, a binder having a crosslinked structure is provided by blending 10 wt % of 2-ethylhexyl acrylate with 90 wt % of PMMA having a weight average molecular weight of about 1,000,000. The PMMA has 4 to 5 crosslinking points per unit with a molecular weight of 10,000 so as to improve lifespan and safety. Also, the PMMA is partially capped with alkali metals to induce crosslinking. The alkali metals are isolated from the PMMA by heat treatment at 160° C. before the crosslinking of the binder takes place. The polymerization of acrylic rubber may be generally performed via suspension polymerization, emulsion polymerization, bulk polymerization, solution polymerization, or the like. Additionally, the polymerization may be performed not only in a continuous system but also in a batch system.

To improve the crosslinkability of the binder, the porous membrane may be subjected to a two-step heat treatment process including a heating and drying step and a high-temperature polymerization step. First, a paste is obtained by mixing the ceramic material, the binder and a solvent and the past is formed on either or both of the cathode and anode. Then, the paste is heated at about 100 to about 120° C. for about 2 to about 5 hours to allow the solvent to evaporate, and to preheat the binder. After evaporation of the solvent, the residual solvent content is maintained at about 300 ppm or less. Then, polymerization is performed at a high temperature ranging from about 150 to about 200° C. for about 5 to about 20 hours.

According to one embodiment of the present invention, the ceramic material of the porous membrane comprises secondary particles formed by partial sintering or recrystallization of primary particles of a ceramic material. The secondary particles may be bonded to each other by the binder, thereby forming a porous membrane. The secondary particles may be present as hexahedral particle clusters (that is, in a shape resembling a bunch of grapes) or as layered particle clusters. Additionally, primary particles of the ceramic material may also be present in the shape of hexahedral particle clusters or layered particle clusters, wherein scale-like particles are stacked and bonded to each other. In one embodiment, an individual particle of the hexahedral particle cluster or the secondary particle, has a size ranging from about 0.01 to about 0.3 mm, and an individual scale-like flake forming the layered particle cluster has a width ranging from about 100 nm to about 1 μm. The aforementioned particle dimensions can be determined by observing a good quality photograph of the material, such as one taken by scanning electron microscopy (SEM).

Nonlimiting examples of suitable ceramic materials for use in the present invention include silica ($SiO_2$), alumina ($Al_2O_3$), zirconium oxide ($ZrO_2$), titanium oxide ($TiO_2$), ion conductive glass, and mixtures thereof. In one embodiment, the ceramic material may be zirconium oxide.

Zirconium oxide shows excellent dispersibility in terms of the zeta($\zeta$) potential relationship when mixed and stirred with an acrylic rubber binder having a crosslinked structure, thereby providing excellent productivity. Also, zirconium oxide is chemically stable and cost efficient. Moreover, zirconium oxide shows excellent heat conductivity and forms good p/n bonding with lithium compounds at high temperature, giving it diode characteristics. Further, zirconium oxide prevents excessive amounts of lithium ions from being intercalated into the anode.

Other suitable, nonliming examples of ceramic materials that may be used to form the porous membrane include insulative nitrides, hydroxides or ketones of zirconium, aluminum, silicon or titanium, and combinations thereof. The term "insulative nitride" is used to exclude a conductive nitride such as titanium nitride (TiN) from the scope of ceramic materials suitable for use in the present invention.

To form the secondary particles, various chemical and physical methods can be used. For example, the corresponding material may be completely dissolved or the surface of the primary particles may be partially dissolved using a chemical substance, followed by recrystallization. One particular example of a physical method includes application of external pressure. As a non-limiting example of a physical method, the particles may be heated to a temperature near the melting point of the particles followed by necking.

When the particles are partially molten or partially sintered to form particle agglomerates, the ceramic material is molten to such a degree that the resultant porous membrane can have a low density. The unique particle shape can be maintained while the paste or dispersion for forming the porous membrane is formed by mixing and agitating the ceramic material with the binder and the solvent.

For example, when the ceramic material (e.g. zirconium oxide) is heated at 900° C. for 10 minutes, a structure of partially sintered particles can be obtained. It is also possible to re-precipitate the ceramic material by dissolving the ceramic material using a solvent providing high solubility to the ceramic material, or by mixing the primary particles with a part of the solvent and removing the solvent.

The ceramic material preferably has a heat expansion ratio of about 0.2% or less at 200° C. and a heat expansion ratio ranging from about 0.1 to about 0.4% at 400° C. If the ceramic material has a heat expansion ratio greater than the above range, an increase in the internal pressure of a battery may result, causing deformation of the battery.

In one embodiment, the porous membrane (formed of the ceramic material and the acrylic rubber having a crosslinked structure) has a porosity of at least about 50%. The porosity refers to the ratio of the vacancy to the total section of the corresponding object, and represents a degree of pore formation in the corresponding object (like bulk porosity). Porosity can be determined by SEM of the section of the material.

When partially sintered particles are used, particle agglomerates are randomly present. The particle agglomerates interrupt the regular spatial packing of particles that could otherwise be seen in a normal crystal structure. In other words, it is difficult for the filler formed of the ceramic material to be packed closely and densely in the space corresponding to the porous membrane. Additionally, it is possible to prevent the acrylic resin from being packed in the interstitial volumes of the particles by reducing the proportion of the resin. In this manner, it is possible to increase the porosity of the porous membrane.

In one embodiment, the ceramic material has a heat conductivity of about 10 W/(m·K) over a broad range of temperatures ranging from about 500° C. to about 1000° C.

Additionally, the ceramic material may have a relative permittivity ranging from about 1 to about 20. If the ceramic material has a relative permittivity greater than about 20, it is difficult to provide sufficient capacity. If the ceramic material has a relative permittivity less than about 1, it is difficult to form a material having a band gap.

Further, the ceramic material may exhibit a dielectric loss of about $10^{-5}$ to about $10^{-2}$ at a frequency of about 1 MHz. If the dielectric loss is less than about $10^{-5}$, it is difficult to obtain a desired band gap due to the low reproducibility, and the porous membrane cannot be stably produced. If the dielectric loss is greater than about $10^{-2}$, it is difficult to obtain sufficient capacity.

According to one embodiment of the present invention, the porous membrane may be attached to at least one surface of the cathode or anode, or both, of a lithium rechargeable battery. Each of the cathode and the anode is obtained by applying an electrode slurry composition (including an active material, a binder and a conductive agent, dispersed in a solvent) onto an electrode collector. To form the porous membrane, the paste for forming the porous membrane is further applied onto the electrode coated with the active material, and then the solvent is removed from the applied paste by baking.

The porous membrane may be formed in such a manner that it substantially surrounds the electrode plate. For example, the paste for forming the porous membrane may be prepared first, wherein the paste includes the ceramic material dispersed uniformly in the mixture of the solvent and the acrylic rubber binder having a crosslinked structure. Then, the electrode plate (which includes the active material coated on the electrode collector) is dipped into the paste. It is also possible to form the porous membrane by spraying the paste onto the electrode plate.

When a jelly-roll type electrode assembly formed by stacking and winding both electrodes is desired, the porous membrane is formed on at least one surface of the cathode and the anode. In one embodiment, the porous membrane layers are positioned facing each other and are formed on the outer surface of each electrode. Alternatively, it is possible to form the porous membrane on the inner surface of each electrode. As used herein, the terms "outer" and "inner" refer to an orientation in a wound jell-roll type electrode assembly. In another variation, it is possible to form the porous membrane on the inner surface as well as the outer surface of either of the cathode and the anode.

When the electrode is dipped into the paste for forming the porous membrane (which includes secondary particles of the ceramic material dispersed uniformly in a liquid mixture of the binder and the solvent) the porous membrane may be present on the inner surface, the outer surface and the upper and lower side surfaces. In other words, all exposed surfaces of the electrode may be covered with the porous membrane. Therefore, it is possible to prevent an electric short circuit between the electrode coated with the porous membrane and another electrode.

The porous membrane may have a thickness that is controllable or selectable based on the desired ion conductivity and energy density. For example, the separator may have a thickness ranging from about 1 to about 40 μm. In one embodiment, the porous membrane has a thickness ranging from about 5 to about 20 μm. If the separator has a thickness less than about 1 μm, the porous membrane will exhibit low strength. If the porous membrane has a thickness greater than about 40 μm, it will be difficult to obtain a desired energy density.

According to one embodiment of the present invention, a small amount of the acrylic rubber binder having a crosslinked structure is used in the paste or slurry for forming the porous membrane. In a porous membrane according to one embodiment of the present invention, the weight ratio of the ceramic material to the binder ranges from about 98:2 to about 80:20. In another embodiment, the weight ratio of the ceramic material to the binder ranges from about 98:5 to about 90:10. Within the above weight ratio ranges, it is possible to prevent the ceramic material from being totally encapsulated by the binder. In other words, it is possible to prevent the problem of limited ion conduction into the ceramic material caused by the total encapsulation of the ceramic material by the binder.

After forming the porous membrane on either or both of the cathode and the anode, both electrodes may be stacked and wound. Since the porous membrane is coated on the electrodes, an additional separator between both electrodes is not needed. Although conventional film-like separators tend to shrink or melt at high temperatures, the inventive porous membrane has little possibility of shrinking or melting. As mentioned above, a conventional polyolefin-based film separator may generate a harder short circuit in response to overheating because after an initial portion of the conventional separator is damaged by initial heat emission, additional portions adjacent to the damaged portion shrink or melt continuously, thereby increasing the area of the separator that is lost by combustion. However, an electrode having an inventive porous membrane is only slightly damaged at the site where an internal short circuit occurs, and the short circuit does not extend to a greater area. Additionally, the electrode having an inventive porous membrane does not cause a hard short circuit but rather a soft short circuit upon overcharge, thus consuming overcharged current continuously and maintaining a constant voltage between about 5V to about 6V and a battery temperature of about 100° C. or less. As a result, using electrodes having an inventive porous membrane improves overcharge stability.

Although the porous membrane according to the present invention may be formed on either of the cathode and the anode, the porous membrane may also be formed on only one electrode. In one embodiment, the porous membrane is formed on the anode considering the overcharge characteristics if the porous membrane is formed on only one electrode. If the porous membrane is formed on the anode, the porous membrane covering the anode can inhibit the anode surface from generating lithium dendrites during overcharge. The porous membrane causes a soft short circuit at initial overcharge and consumes the overcharged current, while lithium dendrites are generated in a small area having relatively low adhesion to the electrode plate. In this manner, the porous membrane functions as a p/n semiconductor to the lithium metal accumulated on the anode, so that the porous membrane is positively (+) charged to the lithium metal. Therefore, the porous membrane can serve to interrupt lithium cations from intercalating into the anode during overcharge (i.e. the porous membrane has an ion blocking function).

An additional polyolefin-based separator film may be positioned between both electrodes in a wound electrode assembly, as in a conventional lithium rechargeable battery. In this embodiment, both of the inventive porous membrane and the polyolefin-based separator film serve as separators for the resulting rechargeable battery. The polyolefin-based separator film may comprise a single-layer film of polyethylene or polypropylene, or a multilayer film of polypropylene-polyethylene-polypropylene.

As shown in FIG. 1, a lithium rechargeable battery 1 according to one embodiment of the present invention includes a cathode 2 and an anode 3. Although not shown, a porous membrane according to one embodiment of the present invention is coated on at least one of the cathode 2 and anode 3. In the depicted embodiment, the battery 1 also includes a polyolefin-based separator film 4 positioned between the cathode 2 and anode 3. To form the battery, the cathode 2 and anode 3 coated with the inventive porous membrane, and the polyolefin-based separator film 4 are wound together to form an electrode assembly which is placed in a battery case 5 and sealed with a cap assembly 6. An electrolyte is injected into the can to complete the lithium rechargeable battery.

The cathode of the lithium rechargeable battery includes a cathode active material capable of lithium ion intercalation deintercalation. Nonlimiting examples of suitable cathode active materials include composite oxides containing lithium and elements selected from the group consisting of cobalt, manganese and nickel. Typical examples of cathode active materials for use in the present invention include the composite oxides represented by Formulae (1) to (13).

  $Li_xMn_{1-y}M_yA_2$ (1)

  $Li_xMn_{1-y}M_yO_{2-z}X_z$ (2)

  $Li_xMn_2O_{4-z}X_z$ (3)

  $Li_xMn_{2-y}M_yM'_zA_4$ (4)

  $Li_xCo_{1-y}M_yA_2$ (5)

  $Li_xCo_{1-y}M_yO_{2-z}X_z$ (6)

  $Li_xNi_{1-y}M_yA_2$ (7)

  $Li_xNi_{1-y}M_yO_{2-z}X_z$ (8)

  $Li_xNi_{1-y}Co_yO_{2-z}X_z$ (9)

  $Li_xNi_{1-y}Co_yM_zA_\alpha$ (10)

  $Li_xNi_{1-y-z}Co_yM_zO_{2-\alpha}X_\alpha$ (11)

  $Li_xNi_{1-y-z}Mn_yM_zA_\alpha$ (12)

  $Li_xNi_{1-y-z}Mn_yM_zO_{2-\alpha}X_\alpha$ (13)

In Formulae (1) to (13), $0.9:5 \leq x \leq 1.1$, $0 \leq y \leq 0.5$, $0 \leq z \leq 0.5$, $0 \leq \alpha \leq 2$, each of M and M' is independently selected from the group consisting of Mg, Al, Co, K, Na, Ca, Si, Ti, Sn, V, Ge, Ga, B, As, Zr, Mn, Cr, Fe, Sr, V and rare earth elements, A is selected from the group consisting of O, F, S and P, and X is selected from the group consisting of F, S and P.

The anode of the lithium rechargeable battery includes an anode active material capable of lithium ion intercalation/deintercalation. Nonlimiting examples of suitable anode active materials include lithium metal, lithium alloys and carbonaceous materials such as crystalline carbon, amorphous carbon, carbon composites and carbon fiber. Nonlimiting examples of suitable amorphous carbons include hard carbon, cokes, mesocarbon microbead (MCMB) fired at a temperature of about 1500° C. or lower, mesophase pitch-based carbon fiber (MPCF), etc. Nonlimiting examples of suitable crystalline carbons include graphite materials such as natural graphite, graphitized cokes, graphitized MCMB, graphitized MPCF, etc. One non-limiting example of a suitable carbonaceous material has a d(002) value (interplanar distance) ranging from about 3.35 Å to about 3.38 Å, and an Lc value (crystallite size) of at least about 20 nm, as measured by X-ray diffraction. Nonlimiting examples of suitable lithium alloys for use in the present invention include alloys of lithium with aluminum, zinc, bismuth, cadmium, antimony, silicon, lead, tin, gallium and indium.

The cathode collector may include aluminum or an aluminum alloy, while the anode collector may include copper or a copper alloy. The cathode collector and the anode collector may be a foil, a film, a sheet, a punched body, a porous body or a foamed body.

The cathode and the anode may further include a conductive agent to improve conductivity. Nonlimiting examples of suitable conductive agents include graphite-based conductive agents, carbon black-based conductive agents, metal- or metallic compound-based conductive agents and combinations thereof. Nonlimiting examples of suitable graphite-based conductive agents include artificial graphite and natural graphite. Nonlimiting examples of suitable carbon black-based conductive agents include acetylene black, ketjen black, denka black thermal black and channel black. Nonlimiting examples of suitable metal- or metallic compound-based conductive agents include tin, tin oxide, tin phosphate ($SnPO_4$), titanium oxide, potassium titanate and perovskite substances such as $LaSrCoO3$ and $LaSrMnO_3$. The conductive agent is present in an amount ranging from about 0.1 to about 10 wt % based on the total weight of the cathode active material. If the conductive agent is present in an amount less than about 0.1 wt %, electrochemical characteristics may degrade. On the other hand, if the conductive agent is present in an amount greater than about 10 wt %, energy density per unit weight decreases.

The binder for the electrode active material serves to form an active material paste, promotes adhesion of the active material particles and adhesion of the active material to the collector, and provides a buffering effect to minimize swelling and shrinkage of the active material. Nonlimiting examples of suitable binders include polyvinylidene fluoride, polyhexafluoropropylene-polyvinylidene fluoride copolymer (PVDF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinyl pyridine, styrene-butadiene rubber, acrylonitrile-butadiene rubber, and the like. The binder is present in an amount ranging from about 0.1 to about 30 wt % based on the total weight of the electrode active material. In one embodiment, the binder may be present in an amount ranging from about 1 to about 10 wt %. If the binder is present in an excessively small amount, adhesion between the electrode active material and the collector may not be sufficient. If the binder is present in an excessively large amount, adhesion may be improved but it may be difficult to obtain a high battery capacity due to the reduced amount of electrode active material.

The solvent for use in dispersing the electrode active material, the binder and the conductive agent includes a non-aqueous solvent or an aqueous solvent. Nonlimiting examples of suitable non-aqueous solvents include N-methyl-2-pyrrolidone (NMP), dimethyl formamide, dimethyl acetamide, N,N-dimethylaminopropylamine, ethylene oxide, tetrahydrofuran, and the like.

When the inventive porous membrane is formed on the anode, if the binder used in the anode active material is an aqueous binder such as styrene-butadiene rubber, the binder that is used in the porous membrane may be an organic binder. On the other hand, if the binder used in the anode active material is an organic binder, such as polyvinylidene fluoride, the binder used in the porous membrane may be an aqueous binder. If the same organic or aqueous binder is used in both the anode active material layer and the porous membrane, the solvent for dispersing the components of the active material and the separator would be the same. Under such circumstances, when the paste for forming the porous membrane is coated onto a preformed anode active material layer, the coated and dried anode active material layer may undesirably dissolve back into the solvent used in the paste for forming the porous membrane.

When an organic binder is used, the solvent used to provide the paste for forming the porous membrane may include NMP/cyclohexanone in a volume ratio ranging from about 0:100 to about 50:50 (for example 30:70). Alternatively, other mixed solvents may be used containing cyclohexanone and having isopropyl alcohol, toluene or xylene instead of NMP. When the binder for the anode active material is an organic binder, an aqueous binder, such as water should be used as the binder for forming the paste of the porous membrane.

The non-aqueous electrolyte for the lithium rechargeable battery may include a lithium salt and a non-aqueous organic solvent. The non-aqueous electrolyte may further include other additives for improving charge/discharge characteristics and for preventing overcharge. The lithium salt serves as a source for supplying lithium ions in the battery and enables the lithium rechargeable battery to perform basic functions. The non-aqueous organic solvent functions as a medium through which ions participating in electrochemical reactions in the battery can move.

Nonlimiting examples of suitable lithium salts include $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO2CF_3)_3$, $LiN(SO_3CF_3)_2$, $LiC_4F_9SO_3$, $LiAlO_4$, $LiAlCl_4$, LiCl and LiI, and mixtures thereof. The lithium salt may be present in a concentration ranging from about 0.6 to about 2.0 M. In one embodiment, the lithium salt is present in a concentration ranging from about 0.7 to about 1.6M. If the lithium salt concentration is less than about 0.6M, the resultant electrolyte may have low conductivity, resulting in a degradation in the quality of the electrolyte. If the lithium salt concentration is greater than about 2.0M, the resultant electrolyte may have increased viscosity, resulting in a drop in lithium ion conductivity.

Nonlimiting examples of suitable non-aqueous organic solvents include carbonates, esters, ethers, ketones and combinations thereof. The organic solvent should have a high dielectric constant (polarity) and low viscosity so as to increase the degree of ion dissociation and to facilitate ion conduction. One nonlimiting example of a suitable organic solvent includes a mixed solvent containing at least two solvents including a first solvent with a high dielectric constant and high viscosity and a second solvent having a low dielectric constant and low viscosity.

A non-limiting example of a suitable carbonate solvent includes a mixed solvent of a cyclic carbonate and a linear carbonate. Nonlimiting examples of suitable cyclic carbonates include ethylene carbonate(EC), propylene carbonate (PC), 1,2-butylene carbonate, 2,3-butylene carbonate, 1,2-pentylene carbonate, 2,3-pentylene carbonate, etc. In one embodiment, ethylene carbonate and propylene carbonate (which have high dielectric constants) may be used. When artificial graphite is used as the anode active material, ethylene carbonate may be used. Nonlimiting examples of suitable linear carbonates include dimethyl carbonate (DMC), diethyl carbonate (DEC), dipropyl carbonate (DPC), methyl propyl carbonate (MPC), ethyl methyl carbonate (EMC), ethyl propyl carbonate (EPC), etc. In one embodiment, dimethyl carbonate, ethyl methyl carbonate and diethyl carbonate (which have low viscosities) may be used.

Nonlimiting examples of suitable esters for use in the non-aqueous electrolyte include methyl acetate, ethyl acetate, propyl acetate, methyl propionate, ethyl propionate, γ-butyrolactone (GBL), γ-valerolactone, γ-caprolactone, δ-valerolactone, ∈-caprolactone, etc. Nonlimiting examples of suitable ethers include tetrahydrofuran, 2-methyltetrahydrofuran, dibutyl ether, etc. Nonlimiting examples of suitable ketones include polymethyl vinyl ketone, etc.

The following Examples and Comparative Examples are presented for illustrative purposes only and are not to be construed as limiting the scope of the invention.

Fabrication of Samples for Measuring Peel Strength of Porous membrane

An acrylic rubber binder based on PMMA was provided by mixing 10 wt % of 2-ethylhexyl acrylate with 90 wt % of polymethyl methacrylate (PMMA) having a molecular weight of 1,000,000 and crosslinking them at 160° C. The PMMA was partially capped with alkali metals (Na, K). Next, secondary particles of zirconium oxide ($ZrO_2$) as a ceramic material was mixed with the acrylic rubber binder in a weight ratio between about 98:2 and about 90:10. The mixture was diluted with a mixed solvent containing N-methyl-2-pyrrolidone/cyclohexanone in a weight ratio of 3:7 to a viscosity between about 20 and about 1000 cps to provide a paste for forming a porous membrane. Copper foil was dipped into the paste, and the thickness of the coated porous membrane was controlled by using a gravure roller. Then, the solvent was allowed to evaporate at 120° C., and the resultant copper foil coated with the porous membrane layer was heat treated at 150° C. for 5 hours to provide a sample for measuring the peel strength of the porous membrane.

Fabrication of Samples for Measuring Peel Strength of Anode Active Material Layer Artificial graphite as an anode active material, styrene-butadiene rubber as a binder and carboxymethyl cellulose as a thickening agent were mixed in a weight ratio of 96:2:2, and the mixture was dispersed in water to provide an anode active material slurry. The slurry was coated on copper foil having a thickness of 15 μm and then dried. Then, the coated copper foil was rolled to provide a mixed slurry density between about 0.3 and about 1.7 g/cc to form an anode, which was used as a sample for measuring the peel strength of an anode active material layer.

Manufacture of Electrode Assembly Having Porous Membrane Layer

The above anode plate having the anode active material layer was dipped into the paste for forming the porous membrane, and the thickness of the porous membrane layer was controlled using a gravure roller. Then, the solvent was allowed to evaporate at 120° C., and the anode coated with the porous membrane layer was heat treated at 150° C. for 5 hours to form a porous membrane on the anode active material layer. The resulting electrodes were wound.

Peel Strength

The samples obtained as described above was cut to a width of 25.4 mm and a length of 100 mm using a steel ruler. The cut sample was fixed in a holder and 180° peel strength was measured using a tensile strength tester (Hounsfield test equipment, serial No. 0050 model 100 RC). The peel strength was measured at a drawing rate of 100 mm/min to an elongated length of 50 mm.

Examples 1 Through 11

The peel strengths of the samples obtained as described above were measured. Among the samples prepared according to the above described procedures, those samples obtained by winding the anode plate and which exhibited a peel strength of the anode active material to the electrode collector was 2 gf/mm or higher and a peel strength of the porous membrane layer to the electrode collector was 0.2 gf/mm or higher were selected (i.e. Examples 1 through 11). The winding characteristics of each sample was determined by the naked eye. The results are shown in the following Table 1.

TABLE 1

| | Binder content of porous membrane (wt %) | Viscosity of paste for forming porous membrane (cps) | Density of mixed anode slurry(g/cc) | Peel strength of porous membrane to anode collector(gf/mm) | Peel strength of anode active material layer to anode collector (gf/mm) | Winding characteristics as determined by naked eye |
|---|---|---|---|---|---|---|
| Ex. 1 | 3 | 1000 | 1.0 | 0.2 | 2 | No cracking and no separation |
| Ex. 2 | 4 | 800 | 1.2 | 0.2 | 4 | No cracking and no separation |
| Ex. 3 | 4 | 800 | 1.6 | 0.2 | 6 | No cracking and no separation |
| Ex. 4 | 4 | 800 | 1.7 | 0.2 | 8 | No cracking and no separation |
| Ex. 5 | 6 | 500 | 1.0 | 0.5 | 2 | No cracking and no separation |
| Ex. 6 | 6 | 500 | 1.2 | 0.5 | 4 | No cracking and no separation |
| Ex. 7 | 6 | 500 | 1.6 | 0.5 | 6 | No cracking and no separation |
| Ex. 8 | 6 | 500 | 1.7 | 0.5 | 8 | No cracking and no separation |
| Ex. 9 | 10 | 600 | 1.2 | 3 | 4 | No cracking and no separation |
| Ex. 10 | 10 | 600 | 1.6 | 3 | 6 | No cracking and no separation |
| Ex. 11 | 8 | 900 | 1.6 | 5 | 6 | No cracking and no separation |

Comparative Examples 1 Through 6

Samples were fabricated in the same manner as described above with respect to Examples 1 through 11, except that the samples were obtained by winding an anode plate having a peel strength of the anode active material layer to the electrode collector of equal to or less than the peel strength of the separator layer to the electrode collector. The results are shown in the following Table 2.

TABLE 2

| | Binder content of porous membrane (wt %) | Viscosity of paste for forming porous membrane (cps) | Density of mixed anode slurry (g/cc) | Peel strength of porous membrane to anode collector (gf/mm) | Peel strength of anode active material layer to anode collector (gf/mm) | Winding characteristics as determined by naked eye |
|---|---|---|---|---|---|---|
| Comp. Ex. 1 | 3 | 1000 | 0.3 | 0.2 | 0.2 | Separation of anode active material layer |
| Comp. Ex. 2 | 5 | 700 | 0.3 | 0.5 | 0.2 | Separation of anode active material layer |
| Comp. Ex. 3 | 5 | 700 | 0.4 | 0.5 | 0.5 | Separation of anode active material layer |
| Comp. Ex. 4 | 10 | 600 | 1.0 | 3 | 2 | Separation of anode active material layer |
| Comp. Ex. 5 | 8 | 900 | 1.0 | 5 | 2 | Separation of anode active material layer |
| Comp. Ex. 6 | 8 | 900 | 1.2 | 5 | 4 | Separation of anode active material layer |

Comparative Examples 7 Through 10

Samples were fabricated in the same manner as described above with respect to Examples 1 through 11, except that the samples were obtained by winding an anode plate having a peel strength of the anode active material layer to the electrode collector of 2 gf/mm or higher, and a peel strength of the porous membrane layer to the electrode collector of 0.2 gf/mm or less. The results are shown in the following Table 3.

TABLE 3

| | Binder content of porous membrane(wt %) | Viscosity of paste for forming porous membrane (cps) | Density of mixed anode slurry (g/cc) | Peel strength of porous membrane to anode collector(gf/mm) | Peel strength of anode active material layer to anode collector (gf/mm) | Winding characteristics as determined by naked eye |
|---|---|---|---|---|---|---|
| Comp. Ex. | 4 | 300 | 1.0 | 0.1 | 2 | porous memberance cracking |
| Comp. Ex. 8 | 4 | 300 | 1.2 | 0.1 | 4 | Porous membrane cracking |
| Comp. Ex. 9 | 4 | 300 | 1.6 | 0.1 | 6 | Porous membrane cracking |
| Comp. Ex. 10 | 4 | 300 | 1.7 | 0.1 | 8 | Porous membrane cracking |

Comparative Examples 11~15

Samples were fabricated in the same manner as described above with respect to Examples 1 through 11, except that the samples were obtained by winding an anode plate having a peel strength of the separator layer to the electrode collector of 0.2 gf/mm or higher, and a peel strength of the anode active material layer to the electrode collector of 2 gf/mm or less. The results are shown in the following Table 4.

TABLE 4

|  | Binder content of porous membrane (wt %) | Viscosity of paste for forming porous membrane (cps) | Density of mixed anode slurry (g/cc) | Peel strength of porous membrane to anode collector(gf/mm) | Peel strength of anode active material layer to anode collector (gf/mm) | Winding characteristics as determined by naked eye |
|---|---|---|---|---|---|---|
| Comp. Ex. 11 | 3 | 1000 | 0.4 | 0.2 | 0.5 | Separation of anode active material layer |
| Comp. Ex. 12 | 3 | 1000 | 0.7 | 0.2 | 1 | Separation of anode active material layer |
| Comp. Ex. 13 | 5 | 700 | 0.3 | 0.5 | 0.2 | Separation of anode active material layer |
| Comp. Ex. 14 | 5 | 700 | 0.4 | 0.5 | 0.5 | Separation of anode active material layer |
| Comp. Ex. 15 | 5 | 700 | 0.7 | 0.5 | 1 | Separation of anode active material layer |

Comparative Examples 16 Through 18

Samples were fabricated in the same manner as described above with respect to Examples 1 through 11, except that the samples were obtained by winding an anode plate having a peel strength of the porous membrane layer to the electrode collector of 0.2 gf/mm or less, and a peel strength of the anode active material layer to the electrode collector of 2 gf/mm or less. The results are shown in the following Table 5.

TABLE 5

|  | Binder content of porous membrane (wt %) | Viscosity of paste for forming porous membrane (cps) | Density of mixed anode slurry (g/cc) | Peel strength of porous membrane to anode collector(gf/mm) | Peel strength of anode active material layer to anode collector (gf/mm) | Winding characteristics as determined by naked eye |
|---|---|---|---|---|---|---|
| Comp. Ex. 16 | 2 | 500 | 0.3 | 0.1 | 0.2 | porous membrane layer cracking/Separation of anode active material layer |
| Comp. Ex. 17 | 2 | 500 | 0.4 | 0.1 | 0.5 | porous membrane layer cracking/Separation of anode active material layer |
| Comp. Ex. 18 | 2 | 500 | 0.7 | 0.1 | 1 | porous membrane layer cracking/Separation of anode active material layer |

As can be seen from the results shown in Table 2, if the peel strength of the anode active material layer to the electrode collector is less than the peel strength of the porous membrane layer, separation of the anode active material layer occurs so that the battery is difficult to manufacture. According to the results shown in Table 3, if the peel strength of the porous membrane layer to the electrode collector is 0.2 gf/mm or less, the porous membrane cracks regardless of the peel strength of the anode active material layer. Additionally, according to the results shown in Table 4, if the peel strength of the anode active material layer to the electrode collector is 2 gf/mm or less, the anode active material layer separates when the electrode is coated with the porous membrane layer. Further, if the peel strength of the anode active material layer to the electrode collector is 2 gf/mm or less and the peel strength of the porous membrane layer to the electrode collector is 0.2 gf/mm or less, the porous membrane layer cracks and the anode active material layer separates.

Particularly, according to the results of Comparative Examples 4 through 6 as shown in Table 2, the anode active material layer separates because the peel strength of the porous membrane layer is greater than the peel strength of the anode active material layer, even if the peel strength of the anode active material layer to the electrode collector is 2 gf/mm or higher and the peel strength of the porous membrane layer to the electrode collector is 0.2 gf/mm or higher. This is because stress is generated outwardly as the porous membrane formed on the anode active material layer dries, so that the underlying anode active material layer separates from the anode collector.

On the contrary, according to the results of Table 1 (Examples 1 through 11), if the peel strength of the anode active material to the electrode collector is greater than the peel strength of the porous membrane layer, and the peel strength of the anode active material layer is 2 gf/mm or higher, while the peel strength of the porous membrane layer is 0.2 gf/mm or higher, neither cracking of the porous membrane layer nor separation of the anode active material layer is observed.

Examples 12 Through 19

LiCoO$_2$ as a cathode active material, polyvinylidene fluoride as a binder and carbon as a conductive agent were mixed in a weight ratio of 92:4:4, and the mixture was dispersed in N-methyl-2-pyrrolidone as a solvent to form a cathode active material slurry. The slurry was coated on aluminum foil having a thickness of 20 μm, dried and rolled to provide a cathode.

Then, an anode active material layer having a peel strength as described in the following Table 6 was formed on copper foil having a thickness of 15 μm to provide an anode, and a porous membrane having a peel strength as described in the following Table 6 was formed on the anode to a thickness of 10 μm.

The electrodes obtained as described above were wound and compressed, and the resultant electrode assembly was inserted into a prismatic can.

Then, an electrolyte was injected into the can to provide a lithium rechargeable battery. The electrolyte was 1.3M $LiPF_6$ dissolved in a mixed solvent of ethylene carbonate with ethylmethyl carbonate (mixed to a volume ratio of EC:EMC of 3:7).

Comparative Examples 19 and 20

Lithium rechargeable batteries were manufactured in the same manner as in Examples 12 through 19, except that an anode active material layer having a peel strength as described in the following Table 6 was formed on copper foil having a thickness of 15 μm to provide an anode. The cathode and the anode were wound and compressed with a polyethylene (PE)-based separator having a thickness of 20 μm inserted between both electrodes, and then the resultant electrode assembly was inserted into a prismatic can.

Overcharge Safety

Each of the fully charged lithium rechargeable batteries according to Comparative Examples 19 and 20 and Examples 12 through 19 was overcharged under constant-current constant-voltage conditions of 2C/12V. Then, each battery was checked and the results are shown in the following Table 6.

High-Temperature Safety

Each of the fully charged lithium rechargeable batteries according to Comparative Examples 19 and 20 and Examples 12 through 19 was introduced into an oven and heated at a rate of 5° C./min. After the oven was heated to 150° C. for 4 hours, each battery was maintained at the same temperature for 1 hour. Then, each battery was checked and the results are shown in the following Table 6.

Penetration Safety

A nail having a diameter of 5® penetrated completely through the center of each of the fully charged lithium rechargeable batteries according to Comparative Examples 19 and 20 and Examples 12 through 19, along the direction perpendicular to the longitudinal axis of the nail. Then, each battery was checked and the results are shown in the following Table 6.

Drop Safety after Vibration

Each of the fully charged lithium rechargeable batteries according to Comparative Examples 19 and 20 and Examples 12 through 19 was vibrated along the X-axis, Y-axis and Z-axis. The peak amplitude was 0.8 mm, the frequency was varied from 10 Hz to 55 Hz and back to 10 Hz, and the sweep rate was 1±0.055 Hz/min. After completion of the vibration test, each battery was dropped onto an iron plate with a thickness of 10 mm at a height of 1.0 mm from the plate. Each battery was dropped once for each surface of the battery and dropped randomly three times. Each battery was dropped 9 times total. For each battery, twenty battery samples were tested.

In the following Table 6, the number preceding L refers to the number of batteries used in the test. Overcharge safety, high-temperature safety and penetration safety are evaluated by the following criteria: L0: excellent, L1: leakage, L2: scintillation, L2: flame, L3: smoking, L4: ignition, L5: explosion.

For example, 20L4 means that all of the twenty batteries used in the test ignited.

TABLE 6

| | Peel strength of porous membrane to anode collector (gf/mm) | Peel strength of anode active material layer to anode collector (gf/mm) | 2 C/12 V Overcharge | 150° C./1 Hr Oven test | Penetration | Drop after vibration (number of shorts) |
|---|---|---|---|---|---|---|
| Comp. 19 | No porous membrane layer | 2 | 20L5 | 20L5 | 20L5 | 20 |
| Comp. 20 | No porous membrane layer | 4 | 20L5 | 20L5 | 20L5 | 20 |
| Ex. 12 | 0.2 | 2 | 20L0 | 17L0, 3L3 | 11L1, 9L2 | 5 |
| Ex. 13 | 0.2 | 4 | 20L0 | 20L0 | 15L1, 5L2 | 3 |
| Ex. 14 | 0.2 | 6 | 20L0 | 20L0 | 20L1 | 0 |
| Ex. 15 | 0.2 | 8 | 20L0 | 20L0 | 20L1 | 0 |
| Ex. 16 | 0.5 | 2 | 20L0 | 18L0, 2L3 | 16L1, 4L2 | 4 |
| Ex. 17 | 0.5 | 4 | 20L0 | 20L0 | 19L1, 1L2 | 2 |
| Ex. 18 | 0.5 | 6 | 20L0 | 20L0 | 20L1 | 0 |
| Ex. 19 | 0.5 | 8 | 20L0 | 20L0 | 20L1 | 0 |

The batteries according to Comparative Examples 19 and 20 contain conventional polyethylene (PE) separators, and the batteries differ only in terms of the peel strength of the anode active material layer (2 gf/mm vs. 4 gf/mm). When using a conventional PE separator alone, as in Comparative Examples 19 and 20, battery explosion occurred to a degree of L5 or higher in the overcharge test, the oven test and the penetration test. Also, in the drop test after vibration, the film layers became disaligned, resulting in the generation of short circuits.

In each of the batteries according to Examples 12 through 19, the porous membrane is formed on the anode without the use of a PE separator. As can be seen from Tables 1 through 5, the anode active material layer and the porous membrane have peel strengths higher than the critical peel strength so as to prevent the porous membrane from cracking and the anode active material layer from separating upon winding. As a result, the batteries can be easily manufactured. Also, in each of the batteries according to Examples 12 through 19, the peel strength of the porous membrane layer to the electrode collector is less than the peel strength of the anode active material layer supporting the porous membrane.

strengths of the anode active material as described in the following Table 7. The peel strength of the porous membrane layer was measured before battery assembly for the porous membrane applied on the portions of the anode plate not coated with the active material. The peel strength of the anode active material layer was measured before it was coated with the porous membrane layer. Next, the battery was subjected to one charge/discharge cycle. Then, the battery was disassembled, and the lithium salt, electrolyte and electrolyte additives remaining on the electrode plate were removed from the electrode plate using DMC. The electrode plate was dried in a dry room for at least 30 minutes, before measuring the peel strength. The results are shown in the following Table 7.

TABLE 7

| | Before battery assembly (measured for dried electrode plate) | | After battery assembly (measured for electrode plate disassembled from battery, which is obtained by introducing wound jelly-roll like assembly into can, injecting electrolyte and subjecting to one charge/discharge cycle before disassembling the battery) | |
|---|---|---|---|---|
| | Peel strength of porous membrane layer to anode substrate (gf/mm) | Peel strength of active material layer to anode substrate (gf/mm) | Peel strength of porous membrane layer to anode substrate (gf/mm) | Peel strength of active material layer to anode substrate (gf/mm) |
| Ex. 20 | 02 | 2 | 0.1 | 0.4 |
| Ex. 21 | 0.5 | 4 | 0.3 | 1.5 |
| Ex. 22 | 1 | 6 | 0.6 | 2.2 |
| Ex. 23 | 2 | 8 | 1 | 3.8 |
| Ex. 24 | 3 | 10 | 1.2 | 5.6 |
| Ex. 25 | 4 | 12 | 2.3 | 5.8 |
| Ex. 26 | 5 | 14 | 3.4 | 6.1 |
| Ex. 27 | 6 | 16 | 4.5 | 7.2 |

In each of the batteries according to Examples 12 through 19, the peel strength of the porous membrane is 0.2 gf/mm, but the peel strength of the anode active material layer is varied (2, 4, 6 or 8 gf/mm). However, as can be seen from the results of Examples 12 through 19, if the anode active material layer has relatively low peel strength, there is a greater possibility that the anode active material layer will separate from the anode collector during the heat exposure test and the penetration test, resulting in decreased safety. Additionally, as can be seen from the results of the drop test after vibration, generated short circuits increase. Therefore, although the peel strength of the anode active material is acceptable in terms of winding ability at 2 gf/mm or higher, the anode active material should have a peel strength of 4 gf/mm or higher to effectively improve the safety of the porous membrane.

When compared to Comparative Examples 19 and 20, Examples 12 through 19 containing the inventive separator show significantly improved safety.

Measurement of Peel Strength after Battery Assembly

The above-mentioned peel strength of the inventive porous membrane and that of the active material layer, which provide the battery with improved quality, were measured relative to the electrode plate before battery assembly. However, it is also necessary to determine the peel strength after the battery has been assembled, impregnated with an electrolyte, and subjected to charge/discharge cycles.

Examples 20 Through 27

Batteries were manufactured in the same manner as in Examples 12 through 19, except that the anode plates were used having peel strengths of the porous membrane and peel As shown in Table 7, it can be seen that the peel strengths of the active material layer to the electrode collector and the porous membrane layer decrease by 2 to 10 gf/mm and by 0.1 to 3 gf/mm, respectively, after battery assembly.

As can be seen from the foregoing, the present invention provides a lithium rechargeable battery having significantly improved safety, short circuit resistance and heat resistance.

Although certain exemplary embodiments of the present invention have been described for illustrative purposes, those skilled in the art will appreciate that various modifications, additions and substitutions can be made to the described embodiments without departing from the scope and spirit of the invention as disclosed in the accompanying claims.

What is claimed is:

1. A lithium rechargeable battery comprising:
   a cathode and an anode, each of the cathode and anode comprising an electrode active material layer coated on an electrode collector;
   a separator separating the cathode from the anode, the separator comprising a porous membrane coated on at least a portion of the electrode collector of at least one of the cathode and anode, the porous membrane comprising a ceramic material and a binder, wherein a peel strength of the electrode active material layer relative to the electrode collector is greater than a peel strength of the porous membrane relative to the electrode collector, and the peel strength of the porous membrane relative to the electrode collector is greater than 0; and
   a non-aqueous electrolyte.

2. The lithium rechargeable battery as claimed in claim 1, wherein the peel strength of the electrode active material layer relative to the electrode collector is 2 gf/mm or higher when measured before battery assembly, and wherein the peel strength of the porous membrane relative to the electrode collector is 0.2 gf/mm or higher when measured before battery assembly.

3. The lithium rechargeable battery as claimed in claim 1, wherein a difference between the peel strength of the electrode active material layer relative to the electrode collector and the peel strength of the porous membrane relative to the electrode collector is at or between about 1.8 gf/mm and about 14.8 gf/mm.

4. The lithium rechargeable battery as claimed in claim 1, wherein the peel strength of the electrode active material layer relative to the electrode collector is 0.4 gf/mm or higher as measured when the battery is in a discharged state after the battery has been assembled and subjected to at least one charge/discharge cycle, and wherein the peel strength of the porous membrane relative to the electrode collector is 0.1 gf/mm or higher as measured when the battery is in a discharged state after the battery has been assembled and subjected to at least one charge/discharge cycle.

5. The lithium rechargeable battery as claimed in claim 1, wherein a difference between the peel strength of the electrode active material layer relative to the electrode collector and the peel strength of the porous membrane relative to the electrode collector is at or between about 0.3 gf/mm to about 7.1 gf/mm as measured when the battery is in a discharged state after the battery has been assembled and subjected to at least one charge/discharge cycle.

6. The lithium rechargeable battery as claimed in claim 1, wherein the ceramic material comprises secondary particles formed by sintering or recrystallizing primary particles, and wherein the secondary particles are selected from the group consisting of hexahedral particle clusters and layered particle clusters.

7. The lithium rechargeable battery as claimed in claim 6, wherein the hexahedral particle clusters have diameters at or between about 0.01 to about 0.3 μm.

8. The lithium rechargeable battery as claimed in claim 6, wherein the layered particle clusters include scale-like flakes having widths at or between about 100 nm to about 1 μm.

9. The lithium rechargeable battery as claimed in claim 1, wherein the ceramic material is selected from the group consisting of silica ($SiO_2$), alumina ($Al_2O_3$), zirconium oxide ($ZrO_2$), titanium oxide ($TiO_2$) and mixtures thereof.

10. The lithium rechargeable battery as claimed in claim 1, wherein the ceramic material is selected from the group consisting of insulative nitrides of silicon (Si), aluminum (Al), zirconium (Zr) and titanium (Ti), hydroxides of silicon (Si), aluminum (Al), zirconium (Zr) and titanium (Ti), ketones of silicon (Si), aluminum (Al), zirconium (Zr) and titanium (Ti) and mixtures thereof.

11. The lithium rechargeable battery as claimed in claim 1, wherein the ceramic material has a heat expansion ratio of 0.2% or less at 200° C. and a heat expansion ratio at or between about 0.1 to about 0.4% at 400° C.

12. The lithium rechargeable battery as claimed in claim 1, wherein the binder comprises an acrylic rubber.

13. The lithium rechargeable battery as claimed in claim 12, wherein the acrylic rubber comprises a polymer or copolymer of a primary acrylic monomer crosslinked with a crosslinkable comonomer, wherein the crosslinkable comonomer is selected from the group consisting of:
alkyl acrylates, alkenyl chloroacetates, glycidyl group-containing esters and ethers, unsaturated carboxylic acids, 2-chloroethyl vinyl ether, chloromethyl styrene, and acrylonitrile.

14. The lithium rechargeable battery as claimed in claim 13, wherein the primary acrylic monomer is selected from the group consisting of:
alkoxyalkyl acrylates selected from the group consisting of methoxymethyl acrylate, methoxyethyl acrylate, ethoxyethyl acrylate, butoxyethyl acrylate, methoxyethoxyethyl acrylate and dicyclopentenyloxyethyl acrylate;
alkenyl acrylates and alkenyl methacrylates selected from the group consisting of vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate;
unsaturated dicarboxylic acid esters selected from the group consisting of divinyl itaconate and divinyl maleate;
vinyl group-containing ethers selected from the group consisting of vinyl 1,1-dimethylpropenyl ether and vinyl 3,3-dimethylbutenyl ether;
1-acryloyloxy-1-phenylethene; and
methyl methacrylate.

15. The lithium rechargeable battery as claimed in claim 13, wherein the polymer or copolymer of the primary acrylic monomer has a weight average molecular weight at or between about 10,000 to about 5,000,000.

16. A lithium rechargeable battery as claimed in claim 13, wherein the polymer or copolymer of the primary acrylic monomer is mixed with the crosslinkable comonomer in a weight ratio at or between about 90:10 to about 60:40.

17. The lithium rechargeable battery as claimed in claim 1, wherein the ceramic material and the binder are mixed in a weight ratio at or between about 98:2 to about 80:20.

18. The lithium rechargeable battery as claimed in claim 1, further comprising a second separator comprising a polyolefin-based resin film.

19. The lithium rechargeable battery as claimed in claim 1, wherein the porous membrane has a thickness at or between about 1 to about 40 μm.

20. The lithium rechargeable battery as claimed in claim 1, wherein the porous membrane has a porosity of 50% or more.

* * * * *

UNITED STATES PATENT AND TRADEMARK OFFICE
CERTIFICATE OF CORRECTION

| | | |
|---|---|---|
| PATENT NO. | : 8,592,070 B2 | Page 1 of 1 |
| APPLICATION NO. | : 11/508604 | |
| DATED | : November 26, 2013 | |
| INVENTOR(S) | : Jinhee Kim | |

It is certified that error appears in the above-identified patent and that said Letters Patent is hereby corrected as shown below:

In the Claims

Column 26, Claim 16, line 39    Delete "A"

Insert -- The --

Signed and Sealed this

Sixteenth Day of June, 2015

Michelle K. Lee
*Director of the United States Patent and Trademark Office*